(No Model.)
O. SPITZER.
FREIGHT TRANSFERRING DEVICE.
No. 512,066. Patented Jan. 2, 1894.
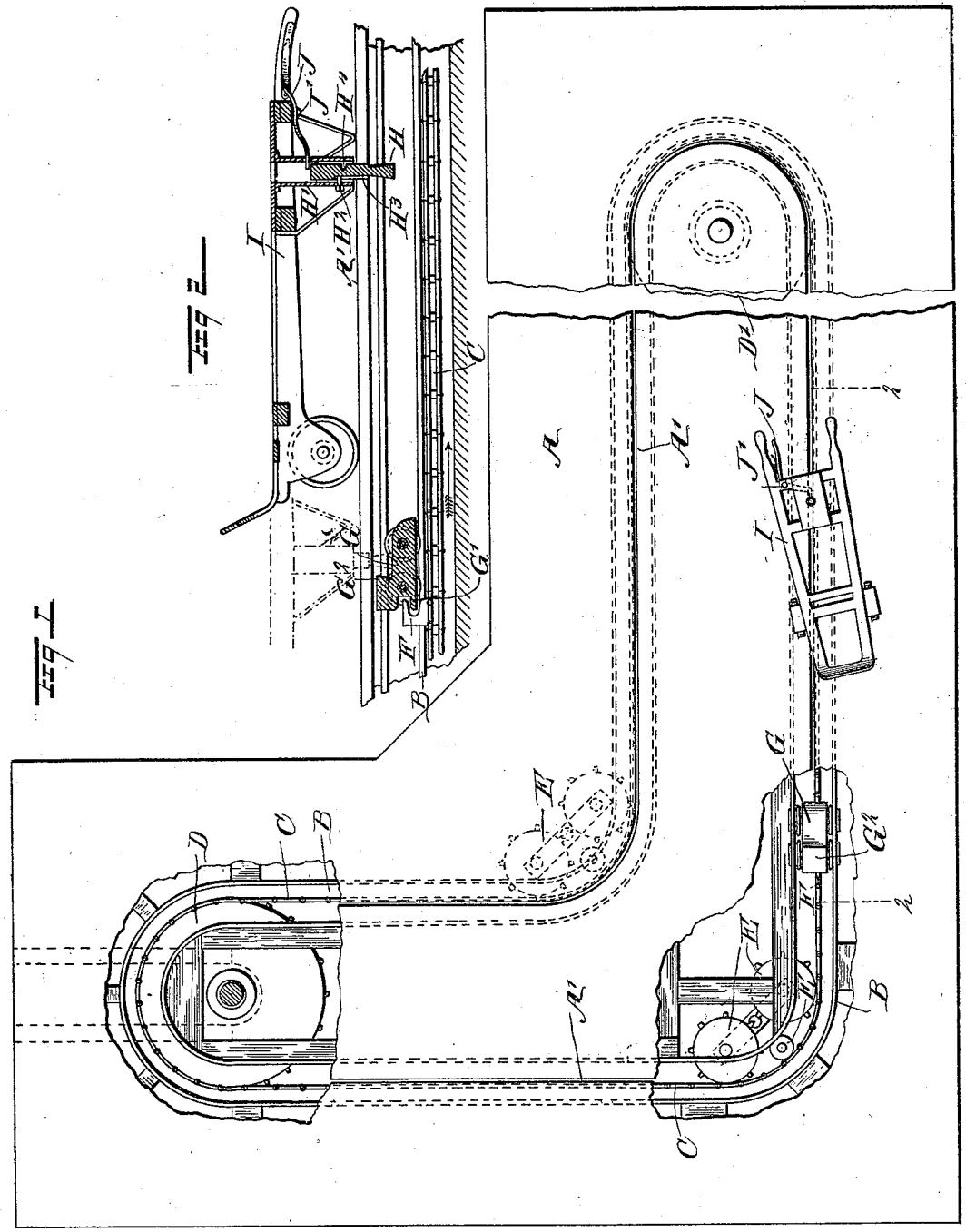
WITNESSES:
H. Walker
C. Sedgwick
INVENTOR
O. Spitzer
BY
Munn & Co
ATTORNEYS.

UNITED STATES PATENT OFFICE.

OLIVER SPITZER, OF BROOKLYN, NEW YORK.

FREIGHT-TRANSFERRING DEVICE.

SPECIFICATION forming part of Letters Patent No. 512,066, dated January 2, 1894.

Application filed September 29, 1893. Serial No. 486,804. (No model.)

*To all whom it may concern:*

Be it known that I, OLIVER SPITZER, of Brooklyn, in the county of Kings and State of New York, have invented a new and Improved Freight-Transferring Device, of which the following is a full, clear, and exact description.

The object of the invention is to provide a new and improved freight transferring device, which is simple and durable in construction, very effective in operation, and more especially designed for use on docks, and in warehouses, factories, &c., for conveniently and rapidly transferring merchandise from one place to another.

The invention consists of certain parts and details, and combinations of the same, as will be hereinafter described and then pointed out in the claims.

Reference is to be had to the accompanying drawings forming a part of this specification, in which similar letters of reference indicate corresponding parts in both the figures.

Figure 1 is a plan view of the improvement with parts broken out; and Fig. 2 is an enlarged side elevation of the same on the line 2—2 of Fig. 1.

Under the platform A, of the dock or other place on which the device is employed is arranged an endless track B, extending from the place of receiving the freight to the point where the freight is to be carried, and back again, either in a straight line or around curves, as illustrated in Fig. 1. In the track B runs an endless chain or cable C, passing at the ends of the track over wheels D and D', of which one is driven by suitable machinery not shown, so that a traveling motion is given to the chain or cable in the fixed track B.

In order to guide the cable around curves so as to hold it in the curve of the track, guide rollers or wheels E are employed, arranged according to the curve as indicated in Fig. 1. On the chain or cable C is arranged one or a series of hooks F, extending upwardly and adapted to engage a transversely-extending bar or ridge G' formed on a truck or carriage G, mounted to run on the track B, the said truck being preferably four-wheeled, as illustrated in the drawings.

The truck G is formed at its top with a transversely-extending shoulder $G^2$ adapted to engage the lower end of a pin H extending downward through a slot A' formed in the platform A directly above the track B and the cable C. This pin H is held to slide vertically in a fixed casing H' attached to a load-carrying vehicle in the form of a hand truck I of usual construction, and adapted to carry the merchandise from one place to another along the platform A.

The pin H is guided in its up and down movement by a set screw $H^2$ screwing in the casing H' and engaging with its inner end a vertically disposed slot or recess $H^3$ formed on one side of the pin H as plainly shown in Fig. 2. The said set screw $H^2$ also limits the downward sliding motion of the pin H.

The pin H may be held within the casing H' at the time the hand truck I is not used on the platform A, and for this purpose a spring-pressed hand lever J is provided, pivoted at J' near one of the handles of the truck and adapted to engage, with its free end a notch $H^4$ formed in the pin H, as plainly shown in Fig. 2. When the operator has hold of the handles of the hand truck I, he can conveniently move the casing H' over the slot A' and by then pressing the spring-pressed lever J disengages the latter from the notch $H^4$, so that the pin H slides downward by its own weight into and through the slot A' so as to be in the path of the shoulder $G^2$ of the truck G. When the hand truck I is in this position as shown in Fig. 2, then its wheels can travel on the platform A, the truck being held in nearly a horizontal position with its legs slightly off the top of the platform, as the pin H rests on the truck G and holds the hand truck I in the position described.

When it is desired to remove the truck and to disconnect the pin H from the slot A', the operator takes hold of the handles of the hand truck and lifts the same so that the pin H moves out of the slot and by then setting the handle end of the truck down again and the operator pressing the lever J, the pin H is free to slide upward so that finally the lever J engages the notch $H^4$ as soon as the said lever is released by the operator. The hand truck can then be wheeled off in the usual manner.

The device is used as follows: When it is desired to transfer, say bags of sugar, from a vessel anchored near one end of the dock, then the truck I receives a bag of sugar, is wheeled over the platform A to the slot A' and there the pin H is dropped in the slot, as above described, by the operator pressing the lever J. Now, when the next truck G on the track B comes along, propelled by the cable C, the shoulder G² engages the pin H and moves the same forward, thus carrying the loaded hand truck along to the other end of the track, at which place an operator takes hold of the handles of the hand truck I and lifts the pin H out of engagement with the shoulder G² and slot A'. The truck with its load is then wheeled off to its destination, and the empty truck is returned and again placed in connection with the next following carriage so as to be returned to the place of loading. At this place the hand truck may be removed and run to the vessel to receive its load, or the load may be placed on the truck while still connected and moving along the platform propelled by the cable C.

The bar G' and the shoulder G² extend throughout the width of the truck or carriage G, so that the hook F is not liable to move out of engagement with the bar G in going around curves, and the shoulder G² is not liable to disengage or leave the pin H.

Having thus fully described my invention, I claim as new and desire to secure by Letters Patent—

1. A device of the class described, comprising an underground track, an endless chain or cable running in the said track and provided with a projection and a wheeled truck running on the said track and adapted to be engaged by the projection of the cable to be propelled thereby, the said wheeled truck being adapted to move a hand truck or other vehicle carrying the load, substantially as shown and described.

2. A device of the class described, comprising an underground track, an endless chain or cable running in the said track and provided with hooks, a wheeled truck running on the said track and adapted to be engaged by the said cable, and a hand truck having a sliding pin adapted to extend through a slot in the platform into the path of the said truck, substantially as shown and described.

3. A device of the class described, comprising an endless chain or cable provided with hooks, a wheeled truck formed with a transversely-extending bar adapted to be engaged by one of the said hooks, the said truck being also provided with a shoulder, and a load-carrying vehicle provided with a pin adapted to be engaged by the said shoulder, substantially as shown and described.

4. A device of the class described, comprising a platform having a slot, an underground track arranged below the said platform, an endless chain or cable running in the said track, a wheeled truck running on the said track and provided with a transversely-extending bar adapted to be engaged by a hook on the said cable, the said truck being also provided on its top with a shoulder, and a load-carrying vehicle adapted to travel on the said platform, and provided with an adjustable pin extending through the platform slot to be engaged by the shoulder of the said truck, substantially as shown and described.

5. A device of the class described, provided with a hand truck having a pin fitted to slide in a casing on the said truck, and a lever for holding the said pin in place, substantially as shown and described.

OLIVER SPITZER.

Witnesses:
 THEO. G. HOSTER,
 C. SEDGWICK.